(12) United States Patent
Harris

(10) Patent No.: US 12,118,206 B2
(45) Date of Patent: Oct. 15, 2024

(54) INTERACTIVE WORKSPACE INTEGRATION SYSTEM AND METHOD

(71) Applicant: Aurora Multimedia Corp., Morganville, NJ (US)

(72) Inventor: Paul Harris, Manalapan, NJ (US)

( * ) Notice: Subject to any disclaimer, the term of this patent is extended or adjusted under 35 U.S.C. 154(b) by 51 days.

(21) Appl. No.: 18/149,738

(22) Filed: Jan. 4, 2023

(65) Prior Publication Data

US 2024/0220100 A1 Jul. 4, 2024

(51) Int. Cl.
H04R 5/04 (2006.01)
G06F 3/01 (2006.01)
G06F 3/04886 (2022.01)
G06F 3/147 (2006.01)

(52) U.S. Cl.
CPC .......... *G06F 3/04886* (2013.01); *G06F 3/017* (2013.01); *G06F 3/147* (2013.01); *H04R 5/04* (2013.01)

(58) Field of Classification Search
None
See application file for complete search history.

(56) References Cited

U.S. PATENT DOCUMENTS

| | | | |
|---|---|---|---|
| D408,383 S | 4/1999 | Carter et al. | |
| 6,397,186 B1 | 5/2002 | Bush et al. | |
| D498,224 S | 11/2004 | Breton et al. | |
| D545,782 S | 7/2007 | Schiller et al. | |
| D660,837 S | 5/2012 | Libman et al. | |
| 8,766,782 B2 | 7/2014 | Madonna et al. | |
| D755,783 S | 5/2016 | Shi et al. | |
| D769,240 S | 10/2016 | Yu | |
| D773,455 S | 12/2016 | Lee et al. | |
| D784,269 S | 4/2017 | Bhattacharya et al. | |
| D784,270 S | 4/2017 | Bhattacharya | |
| D811,384 S | 2/2018 | Diasabeygunawardena et al. | |
| D861,778 S | 10/2019 | Day et al. | |
| D873,781 S | 1/2020 | You et al. | |
| 10,671,042 B2 | 6/2020 | Griffiths et al. | |

(Continued)

OTHER PUBLICATIONS

"L shape tablet 10 inch" https://www.echank.com/product-page/10-inch-I-shape-tablet-with-bar-light-rk3128 published or on sale before at least 2022.*

*Primary Examiner* — Rinna Yi
(74) *Attorney, Agent, or Firm* — Goldstein Law Offices, P.C.

(57) ABSTRACT

An interactive workspace integration system for integrating a physical workspace with a virtual workspace. The system includes multiple electronic devices and controller devices disposed in the physical workspace. The controller devices are interconnected and each controller device is configured to interface with the virtual workspace and control the electronic device. Each controller device includes a programmable processor, a base platform having at least two multi-directional microphones, and a display panel. The display panel includes a screen to display a user control interface and a status bar. Each of the controller devices is configured to receive audio signals from the other controller devices and to receive media signals from the electronic devices. Each controller device is configured to generate a control signal based on the user input, the audio signals, and/or the media signals to control the electronic devices.

8 Claims, 11 Drawing Sheets

(56) References Cited

U.S. PATENT DOCUMENTS

| | | | |
|---|---|---|---|
| D899,383 S | 10/2020 | Dimberg et al. | |
| 2005/0132408 A1 | 6/2005 | Dahley et al. | |
| 2009/0161900 A1* | 6/2009 | Enstad | H04R 1/342 |
| | | | 381/357 |
| 2013/0191741 A1* | 7/2013 | Dickinson | G06F 1/1698 |
| | | | 715/702 |
| 2015/0195489 A1* | 7/2015 | Sobti | H04N 7/142 |
| | | | 348/14.08 |
| 2015/0378546 A1* | 12/2015 | Osborne | G06F 1/1692 |
| | | | 715/833 |
| 2016/0012686 A1* | 1/2016 | Kuscher | G08B 5/36 |
| | | | 704/251 |
| 2016/0327300 A1 | 11/2016 | Ribbich et al. | |
| 2018/0316948 A1 | 11/2018 | Todd | |
| 2020/0125138 A1* | 4/2020 | Lim | G06F 1/166 |
| 2020/0313963 A1* | 10/2020 | Yu | H04L 65/4038 |

* cited by examiner

INTERACTIVE WORKSPACE INTEGRATION SYSTEM AND METHOD

TECHNICAL FIELD

The present disclosure relates generally to a device control system. More particularly, the present disclosure relates to a programmable, interactive remote-control system to control various electronic devices in a group environment.

BACKGROUND

Recent policies have changed the way people work. Increased acceptance and encouragement of remote work has led to advances in computer systems and audiovisual technology to connect people in various locations. Recent technological advancements have resulted in interconnected technological systems, thereby enabling multiple participants in various locations to simultaneously share documents, access the internet, and utilize assistive technologies while collaborating virtually. Such technological capabilities between meeting participants tend to be inferior or unavailable in physical workspace environments.

Despite the advantages of remote work systems, however, there has been increased appreciation and desire for in-person, face-to-face collaboration. In-person work environments tend to provide better opportunities to socialize and connect to company culture, be exposed to informal learning opportunities, network, and access tools and physical resources. In recognition of the discrete advantages provided by both remote and in-person working arrangements, hybrid work environments have emerged as a preferred work situation. Indeed, it is not uncommon to find in the modern workplace an in-person meeting in a physical workspace that involves at least one person in a remote location. Nevertheless, both in-person and hybrid work environments struggle to provide the same quality of technological collaboration, integration, and ease of use as that provided by remote work systems.

Accordingly, what is needed is an interactive control automation system that provides multiple interconnected standalone controller devices for personal use by individual members of a group in a physical environment, where the interactive control automation system promotes physical and virtual interaction between group members. Further what is needed is an interactive control automation system that promotes interaction of physical group members as well as group members at remote locations. Ideally, each controller device would be connected to each other controller device to allow individual group members to share documents, access the internet, and utilize assistive technologies while collaborating with other group members in the meeting. Beneficially, each controller device would enable the group member to "raise a hand" to physically speak or interact with other group members, as well as enabling each group member to control operation of one or more electronic devices in the physical meeting environment.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an interactive workspace integration system for integrating a physical workspace having at least one electronic device with a virtual workspace. In some embodiments, the interactive workspace integration system includes multiple controller devices disposed in the physical workspace, where each of the controller devices is interconnected with each other controller device. Each controller device is further configured to interface with the virtual workspace and to control the electronic device. In some embodiments, each controller device corresponds to exactly one user.

In some embodiments, each controller device includes a programmable processor operably connected to one or more memory devices. The programmable processor also interfaces with the virtual workspace. In some embodiments, the programmable processor includes a Linux™ operating system. In certain embodiments, the programmable processor includes a video graphics engine having a high-definition streaming decoder configured to receive and decode video files.

Each controller device further includes a base platform and a display panel. The base platform extends from a front edge to a back edge along a horizontal axis, and includes at least two multi-directional microphones. The multi-directional microphones are configured to capture sound from the physical workspace, and to convert the sound to audio signals.

The display panel extends substantially orthogonally from the front edge of the base platform. In some embodiments, the display panel includes a display screen and a status bar. The display screen is configured to display a user control interface and receive user input. The status bar is configured to selectively illuminate in response to the user input.

Each of the controller devices is configured to receive the audio signals from the other controller devices and to receive media signals from the one or more electronic devices. Each of the plurality of controller devices is further configured to generate a control signal based on the user input, the audio signals, and/or the media signals to control the electronic device.

In some embodiments, each of the controller devices includes an internal web server configured to display a configuration page on the display panel. In some embodiments, each controller device further includes an audio port disposed on the base platform and configured to couple to an audio output device. The audio output device is configured to process the audio signals to provide audio amplification and/or language translation.

In some embodiments, one of the controller devices is designated as a master device and is configured to control the other controller devices. In some embodiments, the master device is configured to query the other controller devices for a vote of the user. Each of the other controller devices is configured to generate a vote in response to the query, and to transmit the vote to the master device. The master device is configured to tally the votes of the plurality of controller devices. In some embodiments, the status bar of each of the plurality of controller devices is configured to illuminate in response to the vote.

In some embodiments, each of the controller devices includes at least one sensor to gather information from a surrounding environment and to transmit the information to the programmable processor. In some embodiments, the user control interface is configurable to provide a raise hand function, a vote function, an assistive hearing function, and/or a language translation function.

Another aspect of an example embodiment in the present disclosure is to provide a method for integrating a physical workspace having at least one electronic device with a virtual workspace. The method includes providing to multiple users a physical workspace having at least one electronic device. Each of the users is provided with a controller device configured to control the electronic device and to interface with the virtual workspace.

In some embodiments, the controller device includes a programmable processor operably coupled to one or more memory devices. The programmable processor also interfaces with the virtual workspace. The controller device includes a base platform extending from a front edge to a back edge along a horizontal axis, and two or more multi-directional microphones. The multi-directional microphones are configured to capture sound from the physical workspace and to convert the sound to audio signals.

In some embodiments, each controller device further includes a display panel extending substantially orthogonally from the front edge of the base platform. The display panel includes a display screen and a status bar. The display screen is configured to display a user control interface and receive user input, and the status bar is configured to selectively illuminate in response to the user input.

In some embodiments, the method further includes receiving, at the controller device, the user input, audio signals from the other controller devices, and/or media signals from the electronic device. A control signal based on the user input, the audio signals, and/or the media signals is generated at the controller device. The control signal is transmitted to the electronic device.

In some embodiments, receiving the user input includes receiving touch input via the user control interface. In some embodiments, receiving the user input includes capturing sound input from the multi-directional microphones. In some embodiments, noise cancellation and/or echo cancellation may be performed on the sound input.

In some embodiments, receiving the user input includes receiving configuration input designating the controller device as a master device. The master device is configured to control the other controller devices. In these and other embodiments, the method includes querying, by the master device, each of the controller devices for a vote of the user. The master device receives each vote and tallies the votes received.

The present disclosure addresses at least one of the disadvantages discussed above with respect to known workspace solutions. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

As discussed above, interconnected technological systems promote virtual collaboration by enabling multiple participants in various locations to meet virtually while simultaneously sharing documents, accessing the internet, and utilizing assistive technologies. These benefits are largely unavailable to participants in physical workspace environments. The present disclosure addresses these and other issues.

As used herein, the term "media signal" refers to any audio signal, video signal, or combination thereof.

Figure 1:
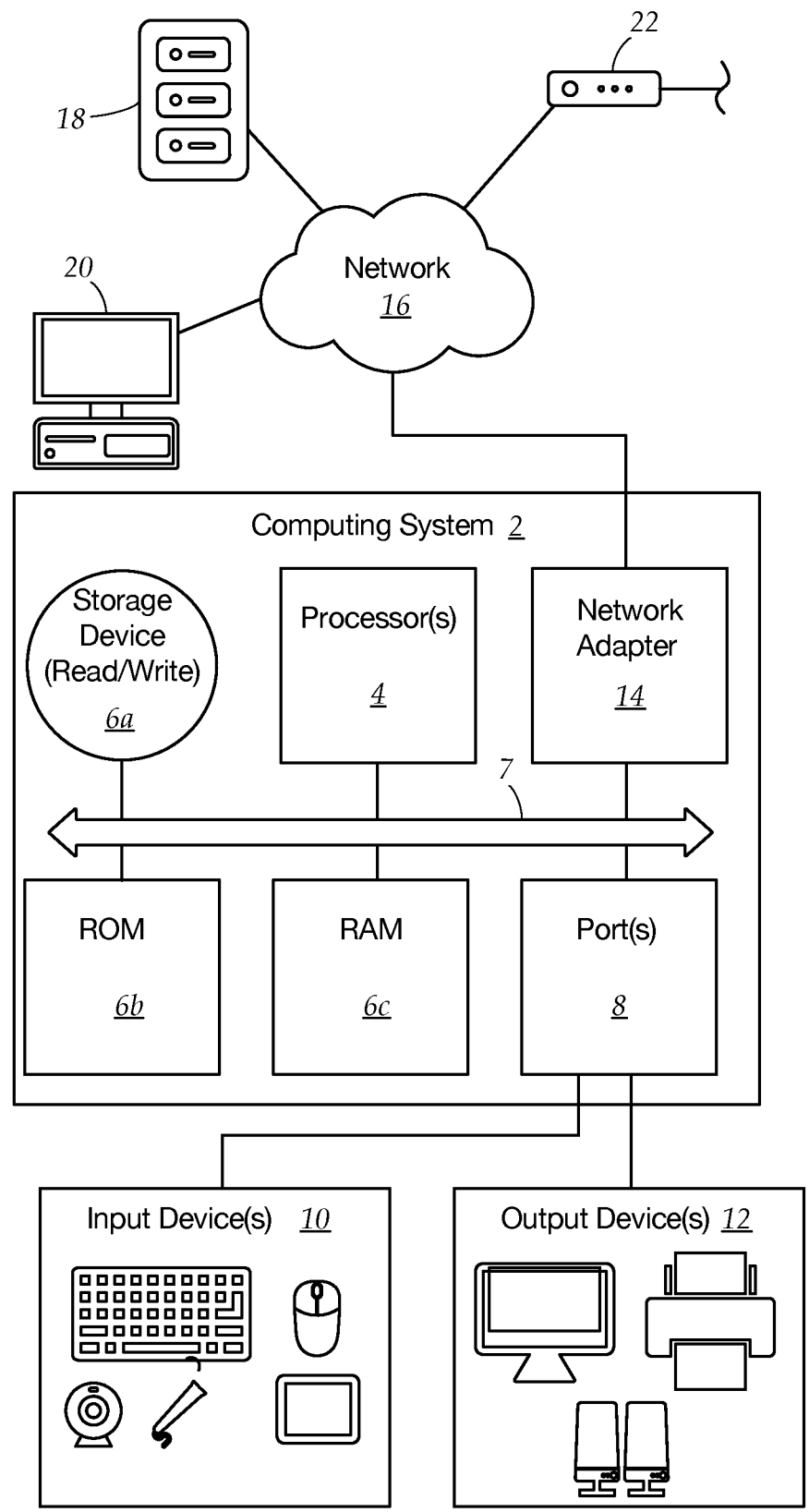
FIG. 1 is a high-level block diagram showing one example of a computing system in which a system and method in accordance with the invention may be implemented.

Referring to FIG. 1, one example of a computing system 2 is illustrated. The computing system 2 is presented to show one example of an environment where a system and method in accordance with the invention may be implemented. The computing system 2 may be embodied as a mobile device such as a smart phone or tablet, a desktop computer, a workstation, a server, or the like. The computing system 2 is presented byway of example and is not intended to be limiting. Indeed, the systems and methods disclosed herein may be applicable to a wide variety of different computing systems in addition to the computing system 2 shown. The systems and methods disclosed herein may also potentially be distributed across multiple computing systems 2.

As shown, the computing system 2 includes at least one processor 4 and may include more than one processor 4. The processor 4 may be operably connected to a memory 6a-c. The memory 6a-c may include one or more non-volatile storage devices such as hard drives 6a, solid state drives 6a, CD-ROM drives 6a, DVD-ROM drives 6a, tape drives 6a, or the like. The memory 6a-c may also include non-volatile memory such as a read-only memory 6b (e.g., ROM, EPROM, EEPROM, and/or Flash ROM) or volatile memory such as a random access memory 6c (RAM or operational memory). A bus 7, or plurality of buses 7, may interconnect the processor 4, memory devices 6a-c, and other devices to enable data and/or instructions to pass therebetween.

To enable communication with external systems or devices, the computing system 2 may include one or more ports 8. Such ports 8 may be embodied as wired ports 8 (e.g., USB ports, serial ports, Firewire ports, SCSI ports, parallel ports, etc.) or wireless ports 8 (e.g., Bluetooth, IrDA, etc.). The ports 8 may enable communication with one or more input devices 10 (e.g., keyboards, mice, touchscreens, cameras, microphones, scanners, storage devices, etc.) and output devices 12 (e.g., displays, monitors, speakers, printers, storage devices, etc.). The ports 8 may also enable communication with other computing systems 2.

In certain embodiments, the computing system 2 includes a wired or wireless network adapter 14 to connect the computing system 2 to a network 16, such as a LAN, WAN, Wi-Fi, or the Internet. Such a network 16 may enable the computing system 2 to connect to one or more servers 18, workstations or personal computers 20, mobile computing devices, or other devices. The network 16 may also enable the computing system 2 to connect to another network by way of a router 22 or other device 22. Such a router 22 may allow the computing system 2 to communicate with servers, workstations, personal computers, or other devices located on different networks.

Figure 2:
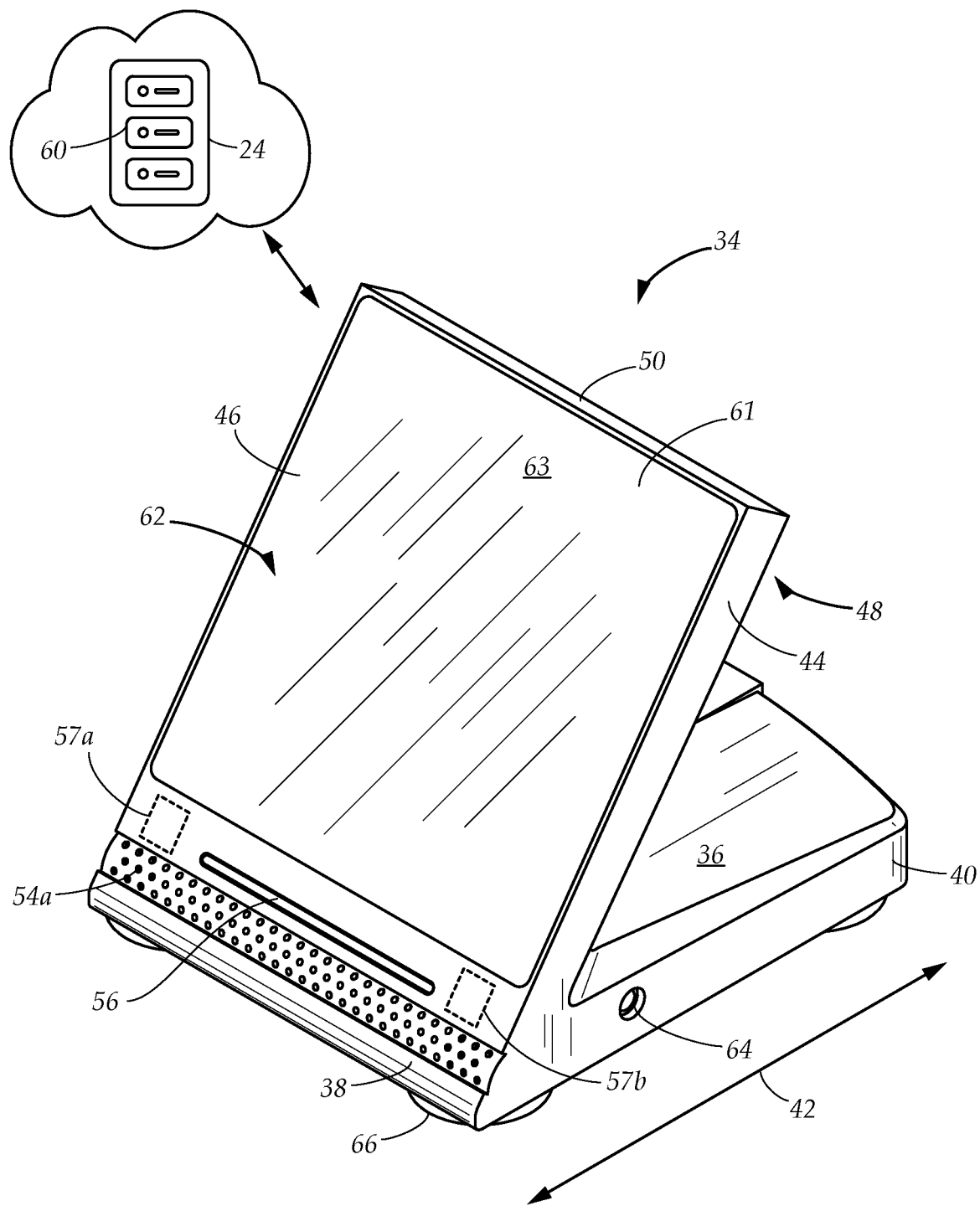
FIG. 2 is a front perspective view of a representative controller device in accordance with the disclosure.
Figure 3:
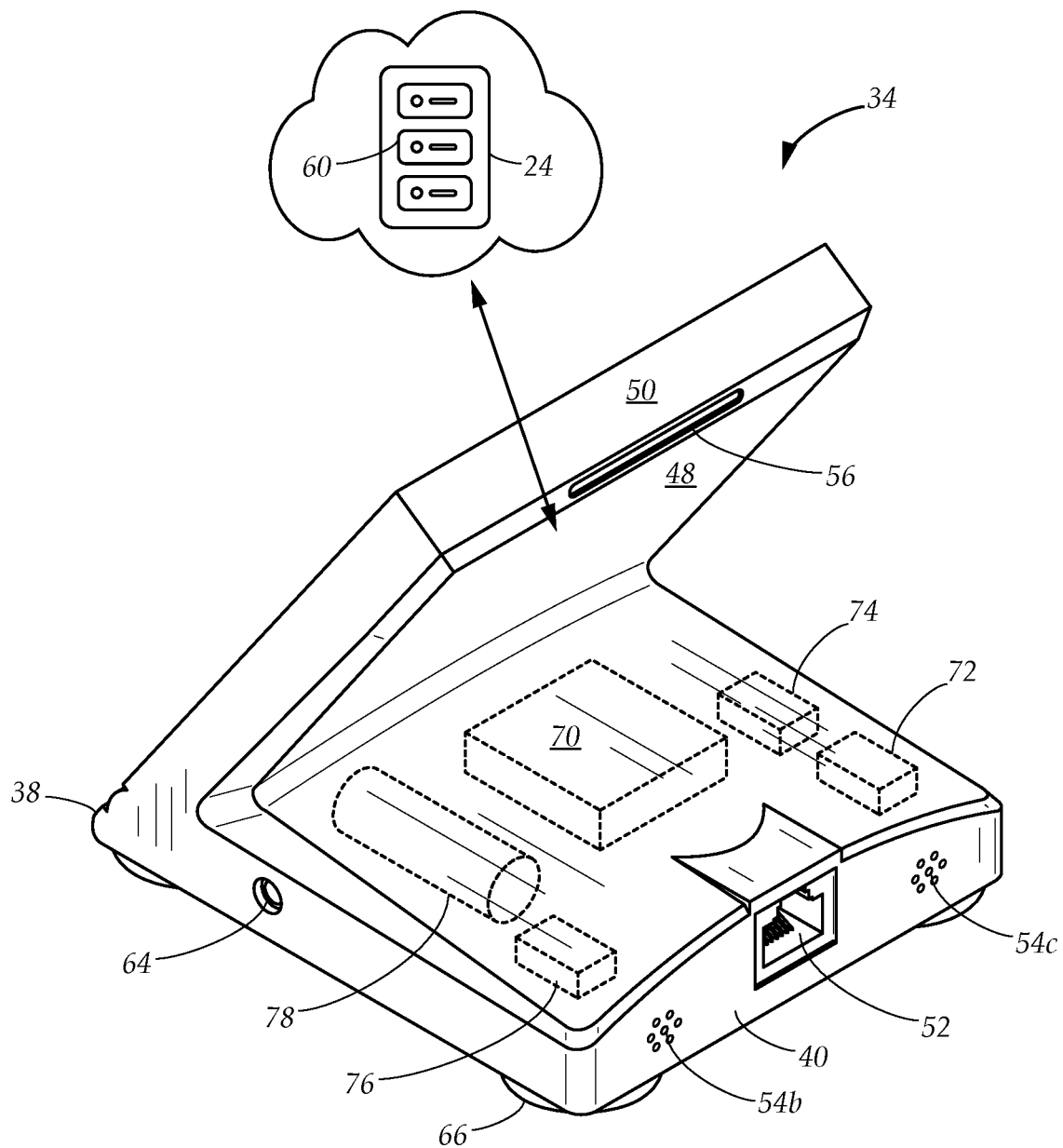
FIG. 3 is a rear perspective view of the controller device of FIG. 2.

Referring now to FIGS. 2 and 3, some embodiments presented herein provide an interactive workspace integration system for integrating a physical workspace having one or more electronic devices with a virtual workspace. In some embodiments, the interactive workspace integration system includes multiple controller devices 34 disposed in the physical workspace, where each of the controller devices 34 is interconnected with each other controller device 34. Each of the controller devices 34 is also configured to interface with a virtual workspace. In some embodiments, the virtual workspace may include any digital technology that enables work and/or collaboration from multiple remote locations. For example, the virtual workspace may include digital technologies such as Zoom, Teams, WebEx, or the like.

In some embodiments, each controller device 34 may correspond to exactly one user. In other embodiments, a controller device 34 may correspond to more than one user. As depicted in more detail with reference to FIG. 5 below while still referring to FIGS. 2 and 3, the physical workspace 28 may include one or more electronic devices 82 such as a stereo, a camera, a computer, a CD/DVD player, a monitor or screen, a light, a speaker, or any other electronic device, for example. The controller device 34 may be configured to control one or more of the electronic devices 82 in the physical workspace.

In some embodiments, each controller device 34 may include a programmable processor 60 operably connected to one or more memory devices. Some embodiments of the programmable processor 60 may include a Linux™ operating system, or any other suitable operating system. In some embodiments, the programmable processor 60 may be local to the controller device 34.

In other embodiments, the programmable processor 60 may be remote to the controller device 34. In one embodiment, for example, the programmable processor 60 may include a remote server 24, such as a cloud server, a mobile device, or any other suitable remote computing device. Processing-intensive tasks such as video processing may be performed by the remote server 24, which may have additional processing resources and capabilities compared to the controller device 34.

For example, in some embodiments, the remote server 24 may include a video graphics engine having a high-definition streaming decoder configured to receive and decode video files. In these and other embodiments, the controller device 34 may maintain connectivity with the remote server 24 by way of an appropriate wired or wireless communication technology, such as a Wi-Fi connection, cellular data connection, or the like. In some embodiments, the controller device 34 may communicate with the remote server 24 by wireless transmission methods such as Wi-Fi, near-field communication ("NFC"), or Bluetooth®. In other embodiments, a video graphics engine and/or high-definition streaming decoder may be included in a programmable processor 60 local to the controller device 34.

Some embodiments of the controller device 34 may include an internal web server 70 to enable a user to configure the controller device 34. In some embodiments, as shown in FIGS. 2 and 3, the controller device 34 may include a base platform 36 and a display panel 44. Some embodiments of the base platform 36 may include the internal web server 70. The internal web server 70 may display a configuration page on the display panel 44. In some embodiments, the display panel 44 may include a user control interface 62 to enable a user to input information to configure the controller device 34.

The base platform 36 may be substantially planar and may extend from a front edge 38 to a back edge 40 along a horizontal axis 42. In some embodiments, the base platform 36 may include a network port 52, such as an ethernet port to facilitate communication with other devices on a shared network. In some embodiments, the base platform 36 may include various ports to enable communication with remote devices, such as the remote server 24. In some embodiments, for example, the base platform 36 may include a Wi-Fi port 72, a Bluetooth port 74, and/or an NFC port 76. Some embodiments of the base platform 36 may also include a power source 78, such as a battery or power cord.

In some embodiments, the base platform 36 may include one or more multi-directional microphones 54a-c integrated with the base platform 36. In some embodiments, the multi-directional microphone 54a-c may be a digital microphone. In some embodiments, the multi-directional microphone 54a-c may include a smart-amplifier speaker. In some embodiments, the multi-directional microphone 54a-c may include a beamforming microphone to provide directional sound transmission and/or reception. In some embodiments, the multi-directional microphone 54a-c may be a microelectromechanical systems (MEMS) microphone.

In some embodiments, as shown in FIGS. 2 and 3, an array of multi-directional microphones 54a-c may be distributed across one or more surfaces of the base platform 36. For example, in one embodiment, one or more multi-directional microphones 54a may be integrated into the front edge 38 of the base platform 36 and two multi-directional microphones 54b, 54c may be integrated into a back edge 40 of the base platform 36 at disparate locations.

Some embodiments of the base platform 36 may include an audio port 64 to receive an audio output device 65 (a shown in FIG. 12), such as a headphone, earphone, speaker, or the like. In some embodiments, the audio output device 65 may enhance the audio signals received through the audio port 64. For example, in some embodiments, the audio output device 65 may provide audio amplification, language translation, or other audio enhancement.

In some embodiments, a bottom surface of the base platform 36 may include a stabilizing feature 66, material, or texture to increase stability of the controller device 34 relative to another smooth surface, such as a desk or tabletop. The stabilizing feature 66 may include, for example, one or more feet or panels comprising rubber, felt, or any other suitable material or element coupled to or integrated with the base platform 36. In some embodiments, the stabilizing feature 66 may be monolithically formed as a single unit with the base platform 36.

The display panel 44 may extend at an angle from the front edge 38 of the base platform 36 such that an acute angle is formed between the display panel 44 and the base platform 36. In this manner, a front surface 46 of the display panel 44 may be tilted upwards toward the user, thereby optimizing the user's view of the display panel 44 as well as facilitating user interaction with the display panel 44, such as receiving user input. In some embodiments, the base platform 36 may be coupled to the display panel 44 via one or more hinges, screws, nails, rivets, or any other suitable mechanical fastener. In other embodiments, the base platform 36 and the display panel 44 may be monolithically formed as a single unit. In some embodiments, the base platform 36 and/or display panel 44 may be molded from a thermoplastic polymer such as acrylonitrile butadiene styrene (ABS), polyamide, polycarbonate, polyphenylene ether (PPE), combinations thereof, or the like.

In some embodiments, the controller device 34 may be substantially compact such that the controller device 34 may be handheld and/or freestanding in a small personal workspace. For example, in one embodiment, the base platform 36 may include a square-shaped platform having dimensions of approximately four (4) inches on each side. The length from the front edge 38 to the back edge 40 may thus be approximately four (4) inches. Of course, the base platform 36 may include any suitable regular or irregular shape having any suitable dimensions.

In some embodiments, the display panel 44 may extend at an acute angle from the front edge 38 of the base platform 36 towards the back edge 40 of the base platform 36 such that the display panel 44 is tilted upwards towards the user. Some embodiments of the display panel 44 may include a front surface 46, a back surface 48, a top edge 50, and a status bar 56. In some embodiments, the display panel 44 may include a shape and/or dimensions substantially matching those of the base platform 36. In some embodiments, the display panel 44 may include a square shape having dimensions less than approximately four (4) inches on each side. Some embodiments may include a three-dimensional structure that does not exceed four inches in any direction including length, width, and height. In other embodiments, the display panel 44 may include any regular or irregular shape having any suitable dimensions. In certain embodiments, a depth of the display panel 44 may be less than or equal to a depth of the base platform 36.

In some embodiments, the display panel 44 may include a display screen 61 to display the user control interface 62 to the user. In some embodiments, the display screen 61 may include a touchscreen 63 to display the user control interface 62 and receive user input in the form of touch input. In some embodiments, the display screen 61 or touchscreen 63 may be coupled to or integrated with the display panel 44 via a press fit, an adhesive and/or any suitable fastening device. In some embodiments, the touchscreen 63 may include a resistive or capacitive touchscreen 63. Some embodiments may include a liquid crystal display (LCD), organic light-emitting diode (OLED), holographic touch display, or other suitable touchscreen 63, or touch display, configured to receive and display touch input from the user. In certain embodiments, the touchscreen 63 may include a square shape, a rectangular shape, or any other suitable shape.

In some embodiments, the front surface 46 of the display panel 44 may include the status bar 56. In other embodiments, the status bar 56 may be coupled to or integrated with the top edge 50 and/or the back surface 48 to facilitate visibility by other users. In other embodiments, the display panel 44 may include a status bar 56 on the front surface and a status bar 56 integrated with the top edge 50 and/or the back surface 48 for facilitating visibility of a status in the front and the rear of the controller device 34. In some embodiments, the status bar 56 may be included on the base platform 36. Some embodiments of the status bar 56 may include one or more light-emitting diodes (LEDs) or other light source configured to selectively illuminate continuously or intermittently in response to user input. In some embodiments, the status bar 56 may indicate whether the multi-directional microphone 54a-c is powered on. In some embodiments, the status bar 56 may blink in response to user input to request the floor, for example.

Figure 5:
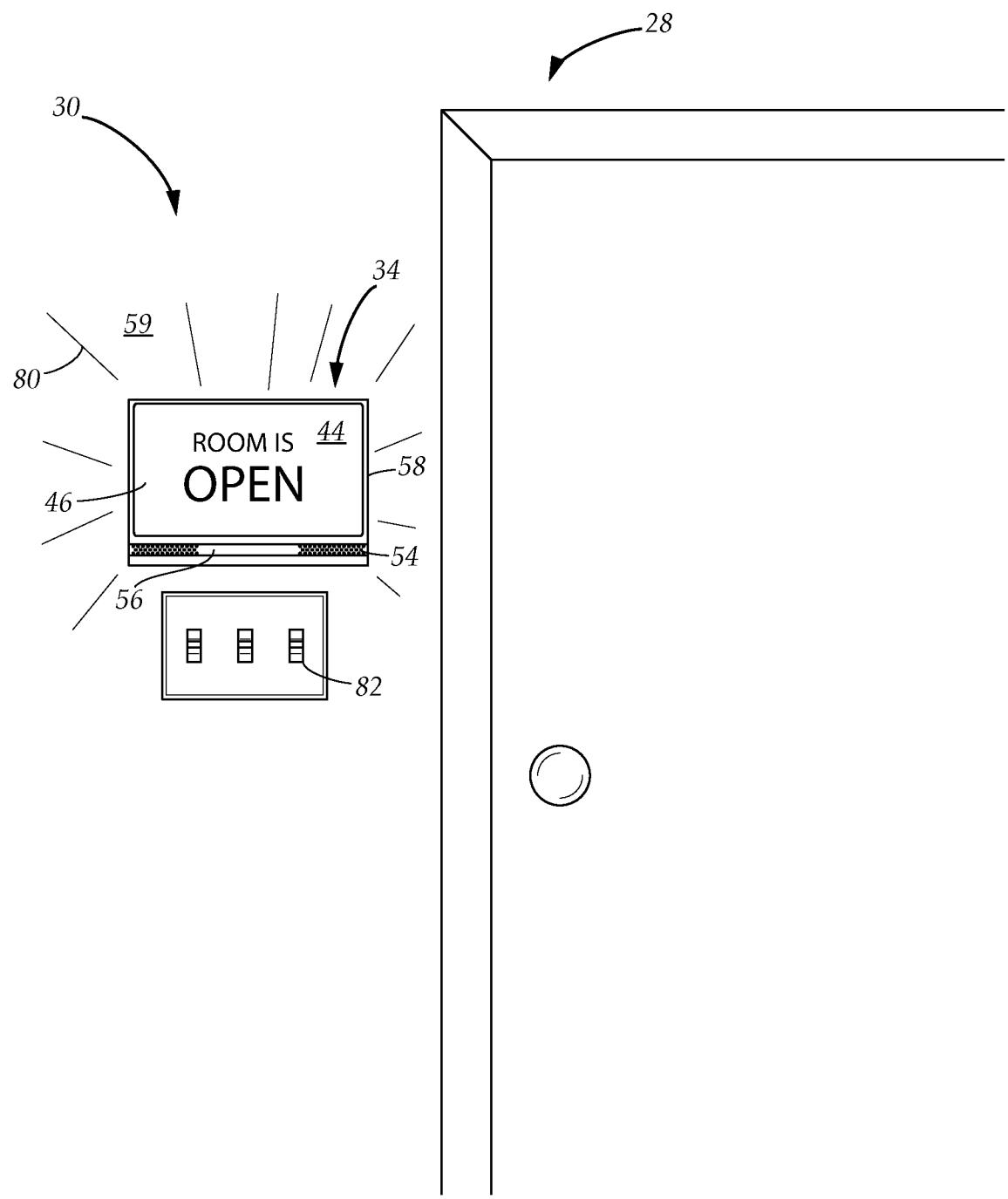
FIG. 5 is a diagrammatic front view of a representative physical workspace having a wall-mounted controller device in accordance with certain embodiments.

In some embodiments, various sensors may be integrated into or coupled to the controller device 34 to gather information with respect to the surrounding environment. Sensors 57a, 57b may include, for example, a proximity sensor, an ambient light sensor, a motion sensor, a location sensor, or the like. Information gathered from the various sensors 57*a*, 57*b* may be processed by the programmable processor 60 to enable the controller device 34 to automatically perform a function or adjust a setting of one or more electronic devices 82 in the physical workspace 28, as shown in FIG. 5. For example, in one embodiment, light sensors 57*a-b* coupled to the controller device 34 may measure and/or monitor ambient light levels in the surrounding environment. In the event that the light sensors 57*a-b* detect low ambient light, the programmable processor 60 may automatically activate lights in the physical workspace 28, as shown in FIG. 5. In some embodiments, the programmable processor 60 may automatically present the user control interface 62 to the user to enable the user to manually adjust an electronic device 82 setting in response to the sensor 57*a-b* information, as shown in FIG. 5.

Figure 4A:
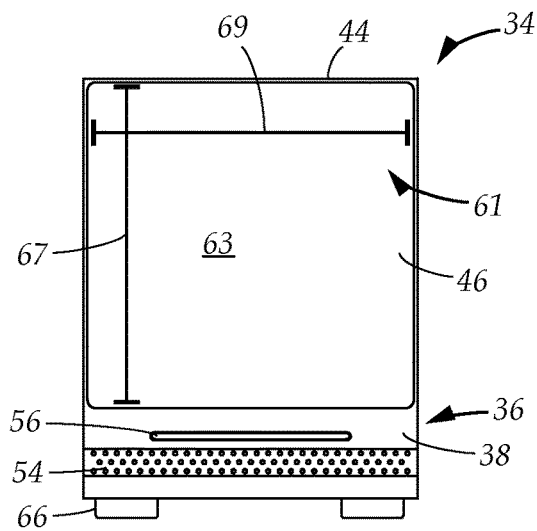
FIG. 4A is a front view of one embodiment of a controller device in accordance with the disclosure.
Figure 4B:
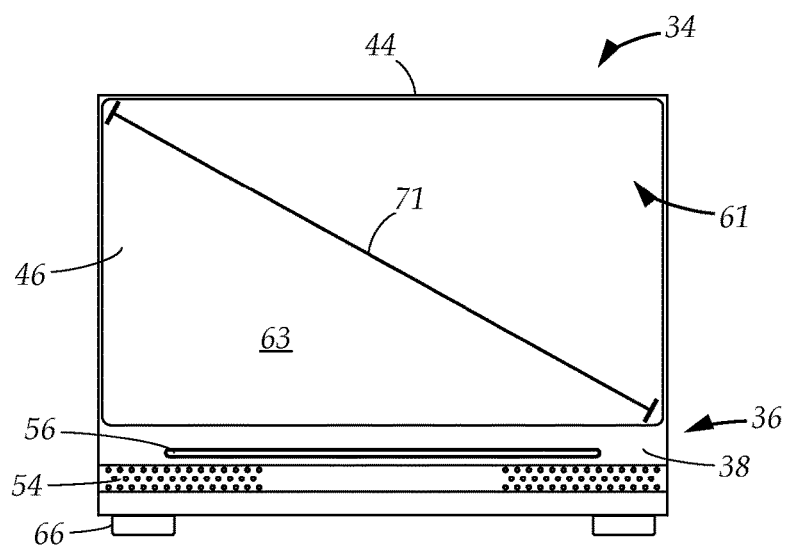
FIG. 4B is a front view of another embodiment of a controller device in accordance with the disclosure.

Referring now to FIGS. 4A and 4B, in some embodiments, the controller device 34 may include a display panel 44 having a display screen 61 such as a touchscreen 63. The touchscreen 63 may include dimensions less than or equal to that of the front surface 46 of the display panel 44. In one embodiment, as shown in FIG. 4A, the touchscreen 63 and the front surface 46 of the display panel 44 may be less than approximately four (4) inches square. In another embodiment, as shown in FIG. 4B, the touchscreen 63 and the front surface 46 of the display panel 44 may be less than approximately four (4) inches measured diagonally 71 from corner to corner. In certain embodiments, the touchscreen 63 may extend over a majority of the front surface 46 of the display panel 44 to maximize usable touchscreen 63 real estate. In these and other embodiments, a height 67 and/or width 69 of the touchscreen 63 may substantially match the height and/or width of the display panel 44.

In some embodiments, a height 67 and/or width 69 of the touchscreen 63 may be reduced relative to the height and/or width of the display panel 44 to provide an increased surface area for various controller device 34 components. For example, in some embodiments, the height 67 of the touchscreen 63 may be reduced relative to the height of the display panel 44 to provide increased surface area for the status bar 56 and/or multi-directional microphone 54, for example. In some embodiments, controller device 34 components may be coupled to or integrated with a front edge 38 of base platform 36. In certain embodiments, as shown, the display panel 44 may extend seamlessly from the front edge 38 of the base platform 36.

Referring now to FIG. 5, in some embodiments, the interactive workspace integration system 30 may include one or more controller devices 34 that include a wall mount 58 or other mechanical fastener to secure the controller device 34 to a wall 59 or other vertical surface. In some embodiments, the controller device 34 may be secured to an exterior or an interior of a wall 59 forming the physical workspace 28. In other embodiments, the controller device 34 may be secured to a wall 59 adjacent to the physical workspace 28.

In some embodiments, the controller device 34 may be configured to display availability of the physical workspace 28. For example, in some embodiments, the controller device 34 may include a user control interface 62 (as shown in FIG. 2) to enable an authorized user to access, schedule, or log use of the physical workspace 28. In some embodiments, the controller device 34 may display a seating arrangement in the physical workspace 28.

In some embodiments, the wall-mounted controller device 34 may include one or more multi-directional microphones 54 to receive verbal instructions or other sound input from a user. In some embodiments, the multi-directional microphone 54 may enable a user located outside the physical workspace 28 to communicate with users inside the physical workspace 28.

Some embodiments may include a status bar 56 configured to illuminate when the multi-directional microphone 54 is on. In some embodiments, the status bar 56 may illuminate when the physical workspace 28 is occupied. In certain embodiments, the status bar 56 may illuminate in different colors to communicate different statuses. For example, the status bar 56 may illuminate in red to indicate that the physical workspace 28 is occupied, in yellow to indicate that a meeting in the physical workspace 28 is starting shortly, and in green to indicate that the physical workspace 28 is available. In some embodiments, the status bar 56 may blink to indicate that the multi-directional microphone 54 is operational, for example.

Some embodiments of the wall-mounted controller device 34 may include a backlight 80 to illuminate the controller device 34 in low-light conditions. In some embodiments, the controller device 34 may control a light 82 or other electronic device 82 in the physical workspace 28.

Figure 6:
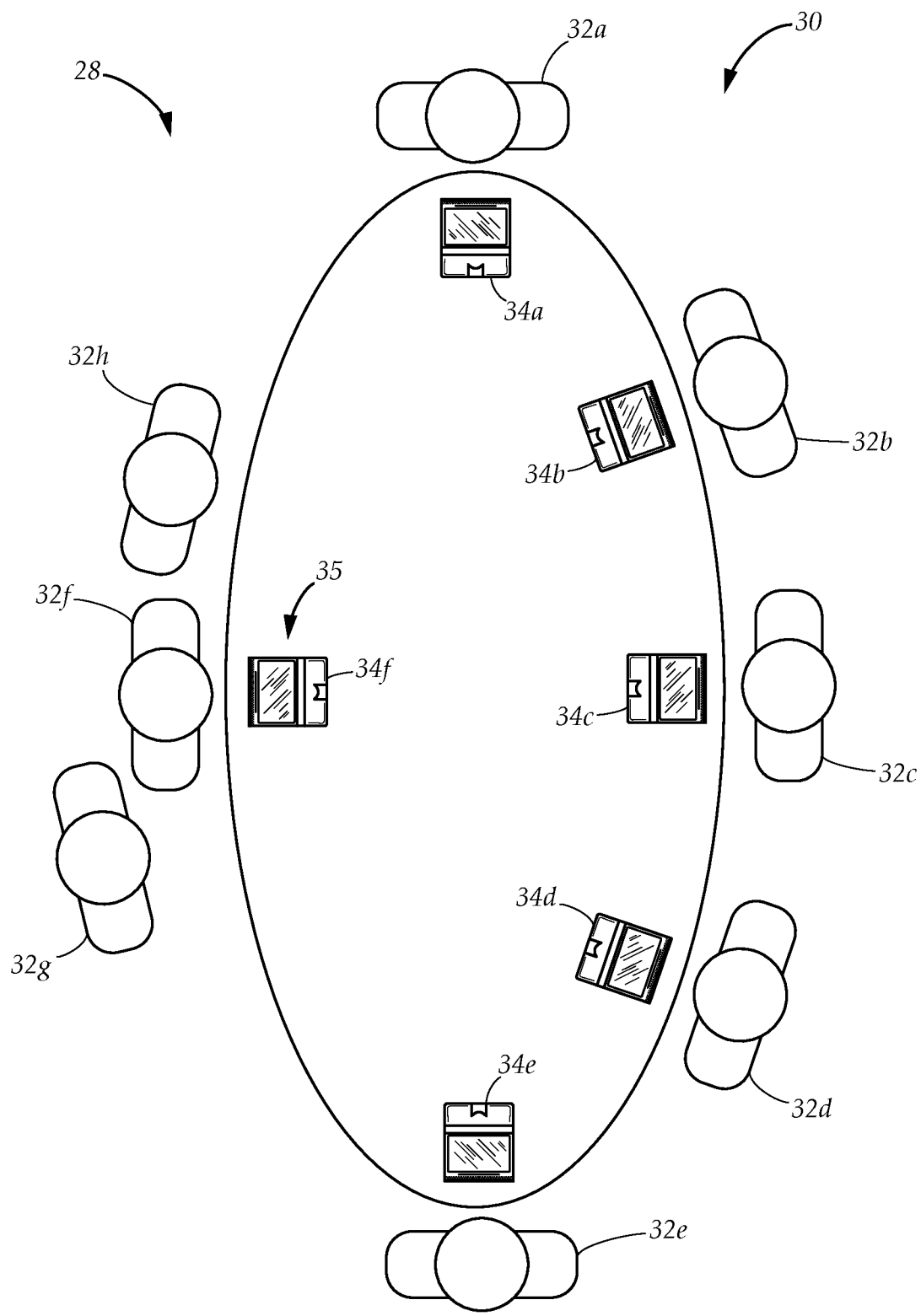
FIG. 6 is a diagrammatic top view of a representative physical workspace including an example interactive workspace integration system in accordance with the disclosure.

Referring now to FIG. 6, in some embodiments, the interactive workspace integration system 30 may include multiple controller devices 34*a-e* corresponding to multiple users 32*a-e*, where each controller device 34*a-e* is controlled by a single user 32*a-e*. In some embodiments, at least one controller device 34*f* may be simultaneously controlled by more than one user 32*f-h*.

In these and other embodiments, the multi-directional microphones 54*a-c* (shown in FIGS. 2 and 3), of one or more controller devices 34*a-f* may perform audio amplification, echo cancellation, or other audio enhancement techniques on the sound input received to provide high-quality audio output to users 32*a-h* in the physical workspace 28 as well as to remote users in the virtual workspace. In some embodiments, one or more controller devices 34*a-f* may be configured to transmit audio signals that provide the sound for a local recording or remote video call (e.g., Zoom, Teams, WebEx).

In some embodiments, one of the controller devices 34*a-f* may be designated a master device 35 and configured to selectively control the other controller devices 34*a-e*. In some embodiments, the master device 35 may be configured to query each controller device 34*a-f* for a vote of the user 32*a-h*. Each of the other controller devices 34*a-f* may be configured to generate a vote in response to the query, and to transmit the vote to the master device 35. In some embodiments, the master device 35 may be configured to display the votes received from each of the controller device 34*a-f*, and/or tally the votes. In some embodiments, the status bar 56 (shown in FIG. 2) of each of the plurality of controller devices 34*a-f* may be configured to illuminate to indicate the vote. In some embodiments, the color of light emitted by the status bar 56 may communicate information regarding the vote.

For example, in certain embodiments, the status bar 56 may emit red light to indicate a vote of no, a green light to indicate a vote of yes, and a yellow light to indicate a vote of undecided. Of course, the status bar 56 may emit any color of light and/or combinations of colors to indicate any desired information. Similarly, in some embodiments, the status bar 56 may be configured to blink to indicate an undecided vote, to emit light continuously to indicate a vote of yes, and to power off to indicate a vote of no. In some embodiments, the status bar 56 may be configured to illuminate to indicate submission of the vote to the master device 35, while the vote itself may be maintained in secrecy.

Figure 7A:
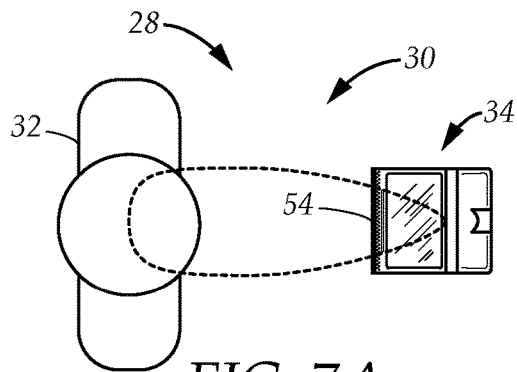
FIG. 7A is diagrammatic top view of a representative interactive workspace integration system illustrating microphone pickup patterns with a single user in accordance with some embodiments.
Figure 7B:
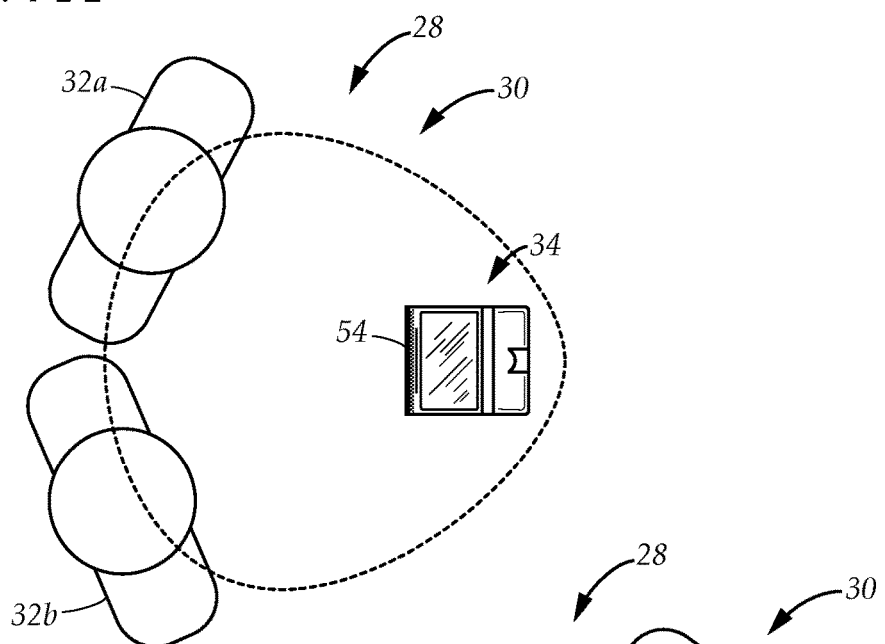
FIG. 7B is diagrammatic top view of a representative interactive workspace integration system illustrating microphone pickup patterns with two users in accordance with some embodiments.
Figure 7C:
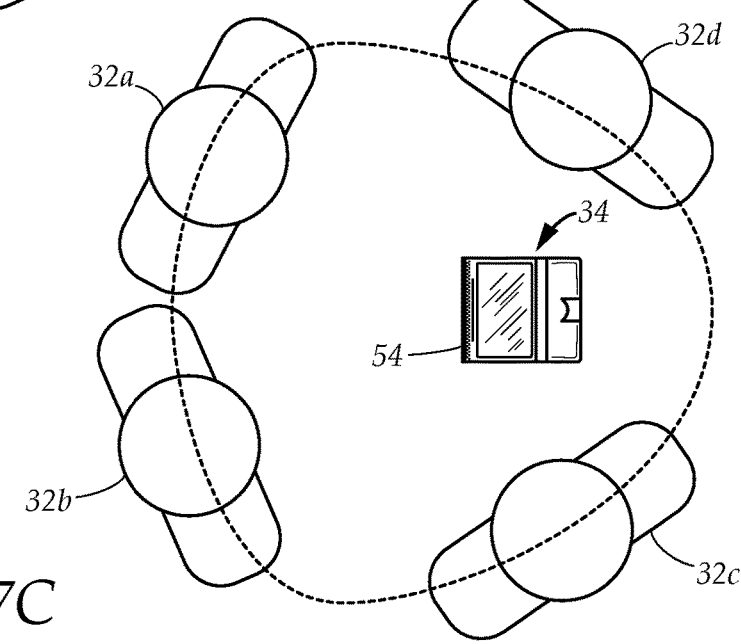
FIG. 7C is diagrammatic top view of a representative interactive workspace integration system illustrating microphone pickup patterns with four users in accordance with some embodiments.

Referring now to FIGS. 7A-7C, in some embodiments, the controller device 34 may include an array of multi-directional microphones 54 to capture and transmit directional sound in the physical workspace 28. In some embodiments, one or more of the multi-directional microphones 54 may be a digital beamforming microphone including a speaker. In some embodiments, the controller device 34 may include a combination of software, hardware, and/or network protocols to capture and convert sound captured by the array of multi-directional microphones 54 to high-fidelity digital audio signals for transmission over a network. In certain embodiments, the array of multi-directional microphones 54 may deliver uncompressed, multi-channel, low-latency digital audio over an ethernet network using Layer 3 IP packets, for example. In other embodiments, the array of multi-directional microphones 54 may deliver compressed audio signals over a network.

In some embodiments, as shown in FIGS. 2 and 3, the array of multi-directional microphones 54a-c may be distributed around an outside perimeter of the base platform 36 to optimize sound localization and extraction from multiple speakers, for example. In some embodiments, for example, one multi-directional microphone 54a may be distributed across a front edge 38 of the base platform 36 and two multi-directional microphones 54b, 54c may be distributed across a back edge 40 of the base platform 36.

FIGS. 7A-7C illustrate various microphone pickup patterns involving an array of multi-directional microphones 54 disposed on a single controller device 34. As shown, distribution of the multi-directional microphones 54 around the controller device 34 may optimize high-fidelity sound capture and transmission in fluid situations where various users 32a-d are situated at various distances from the controller device 34 and in various arrangements relative to each other.

Figure 8:
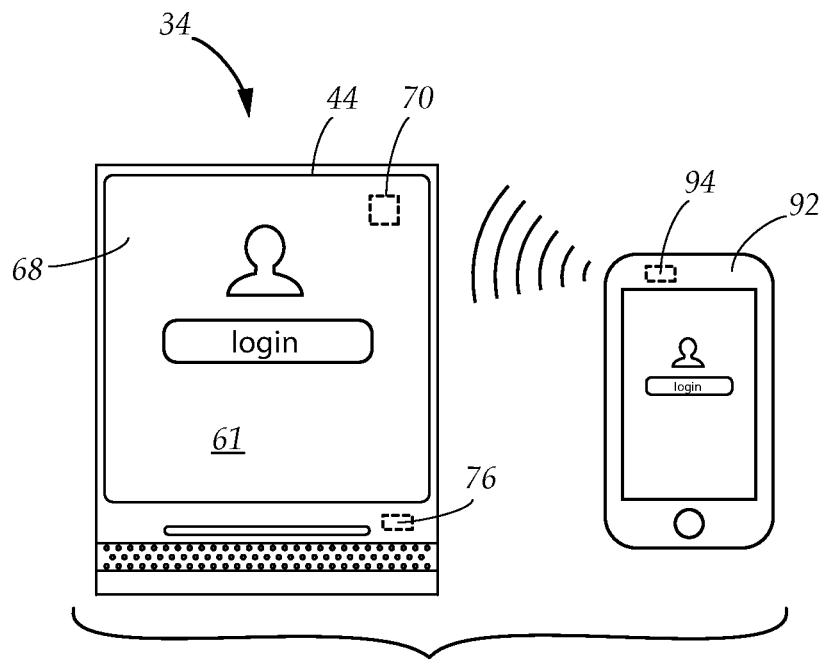
FIG. 8 is a front view of a representative controller device and an example mobile device illustrating wireless communication therebetween in accordance with certain embodiments.
Figure 9:
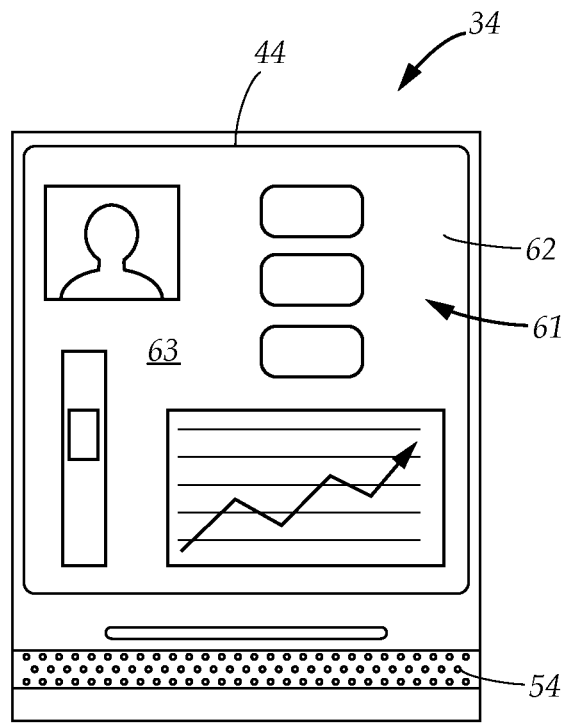
FIG. 9 is a front view of a representative controller device illustrating a configurable user control interface in accordance with some embodiments.

Referring now to FIG. 8, in some embodiments, the controller device 34 may include an internal web server 70 configured to display a configuration page 68 on the display panel 44. Some embodiments of the configuration page 68 may enable a user to enter login information including a name that may be displayed to other users, for example. In some embodiments, the configuration page 68 may also enable the user to select a color scheme or other display options. In some embodiments, the internal web server 70 may store the configuration page 68 locally such that the display screen 61 automatically displays the configuration page 68 upon powering on.

In some embodiments, the controller device 34 may communicate with a user mobile device 92 to receive configuration input from a user. Configuration input may include authorization information such as a username, password, touch identification, photo identification, or the like. In some embodiments, the controller device 34 may communicate with the user mobile device 92 via a wireless communication protocol such as Wi-Fi, near-field communication (NFC), or Bluetooth®. In some embodiments, for example, both the user mobile device 92 and the controller device 34 may include NFC ports 94, 76 such that configuration information and user input may be transmitted via NFC communication protocol.

Referring now to FIGS. 9-12, some embodiments of the display panel 44 have a display screen 61 to display a user control interface 62. In some embodiments, the user control interface 62 may be configured to receive user input including touch input via a touchscreen 63, voice input via one or more multi-directional microphones 54, and/or input from a user input device in communication with the controller device 34. In some embodiments, the user control interface 62 is configurable to display desired text and/or images and to customize the text and/or images in any desired color scheme, font scheme, theme, or the like. In some embodiments, for example, the user control interface 62 may be configured to display a name of the user and/or the user's seat assignment in the physical workspace 28, as shown in FIG. 6. In some embodiments, the user control interface 62 is further configurable to display or link to any desired webpages, news sources, social media, apps, and/or any other desired media or information.

Figure 10:
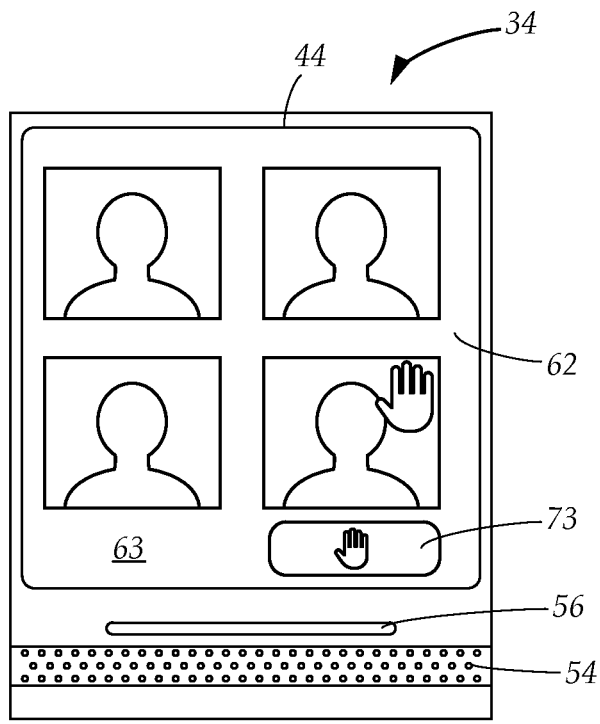
FIG. 10 is a front view of a representative controller device illustrating an example user control interface providing a raise hand function in accordance with some embodiments.

In certain embodiments, as shown in FIG. 10, the user control interface 62 may provide a raise hand function 73 to enable a user to indicate a desire to request the floor or speak. In some embodiments, the user control interface 62 may receive user input via a configurable button. In some embodiments, the user control interface 62 may be overlaid over the virtual workspace such that the button is displayed in connection with the image of the user.

Figure 11:
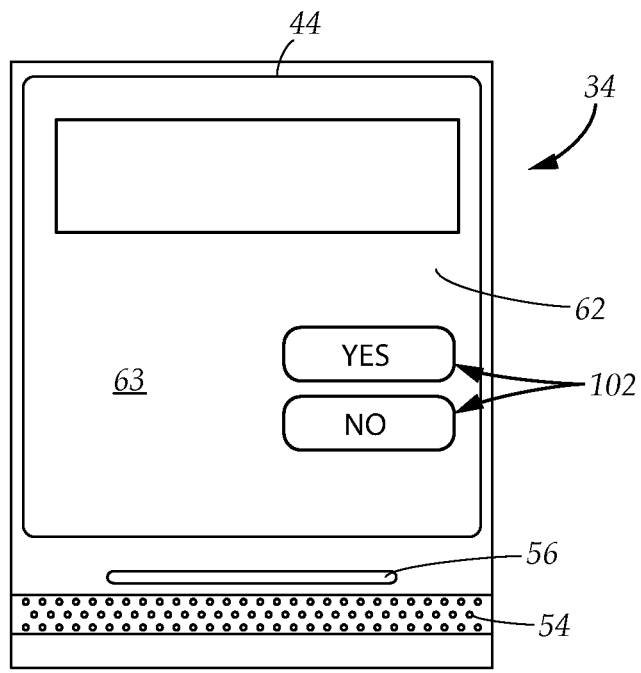
FIG. 11 is a front view of a representative controller device illustrating an example user control interface providing a vote function in accordance with some embodiments.

In some embodiments, as shown in FIG. 11, the user control interface 62 may provide a vote function 102 to enable a user to lodge a vote in response to a verbal query or in response to a query from the master device 35 (shown in FIG. 6), for example. In some embodiments, the user control interface 62 may provide one or more buttons that the user may actuate to submit the vote. In other embodiments, the user control interface 62 may permit a slide to be moved along a continuum to indicate the vote. Of course, any user control interface 62 having any feature that may be selected or manipulated by a user to indicate the vote is contemplated herein. In some embodiments, as discussed above, the status bar 56 may be configured to illuminate in response to the vote.

Figure 12:
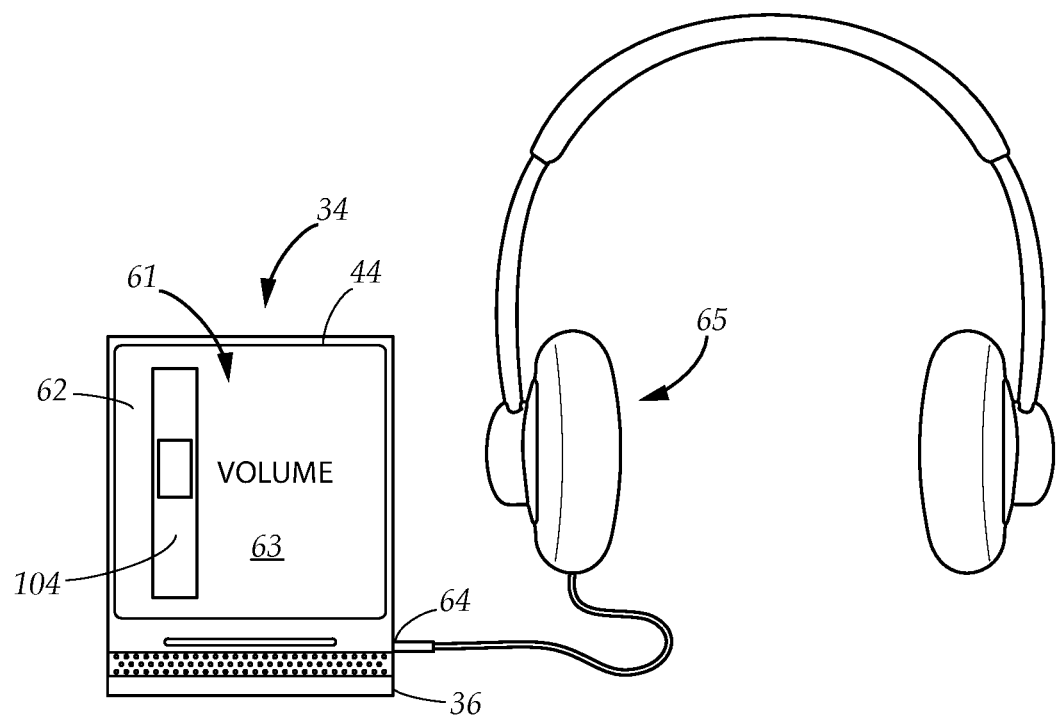
FIG. 12 is a front perspective view of a representative controller device and audio output device illustrating an example user control interface providing an assistive hearing function in accordance with some embodiments.

In some embodiments, as illustrated in FIG. 12, the user control interface 62 may enable the user to actuate an assistive hearing function 104 such as sound amplification, noise cancellation, and/or echo cancellation, for example. In some embodiments, the user control interface 62 may enable the user to adjust a volume of the audio output. In some embodiments, the assistive hearing function 104 may translate voice input to text and the display screen 61 may display the text to the user.

In some embodiments, each controller device 34 may include an audio port 64 disposed on the base platform 36 and configured to couple to an audio output device 65. In some embodiments, the assistive hearing function 104 may be provided through the audio port 64 and/or audio output device 65. In some embodiments, the audio port 64 and/or audio output device 65 may communicate with the programmable processor 60 (as shown in FIG. 2) to provide the assistive hearing function 104.

Similarly, in some embodiments, the user control interface 62 may be configured to provide a language translation function. In some embodiments, the user control interface 62 may provide multiple selectable languages which may be selected via the touchscreen 63, for example. In some embodiments, the audio port 64 and/or audio output device 65 may process sound from the surrounding environment to output sound in the selected language. In some embodiments, the audio port 64 and/or audio output device 65 may communicate with the programmable processor 60 to process the sound.

Figure 13A:
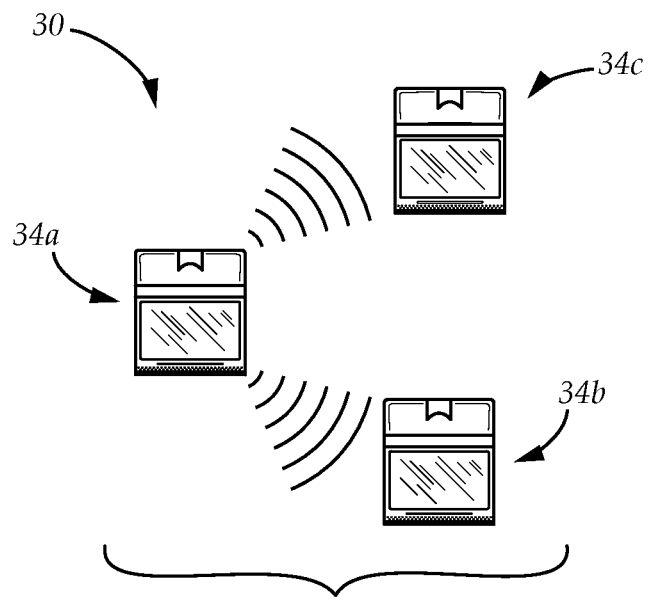
FIG. 13A is a diagrammatic top view of representative controller devices illustrating peer to peer communication in accordance with some embodiments.
Figure 13B:
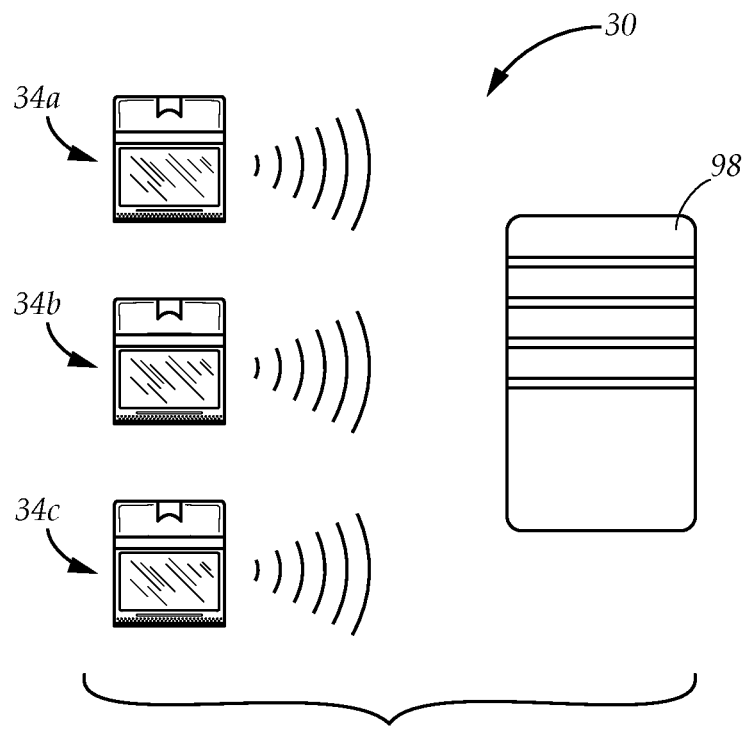
FIG. 13B is a diagrammatic top view of representative controller devices illustrating peer to hub communication in accordance with some embodiments.

Referring to FIGS. 13A and 13B, in some embodiments, each controller device 34a-c may be interconnected with each other controller device 34a-c of the interactive workspace integration system 30. In this manner, as shown in FIG. 13A, each controller device 34*a-c* may broadcast or otherwise transmit information to all other controller devices 34*a-c*, or may selectively broadcast or otherwise transmit information to one or more selected controller devices 34*a-c*. In some embodiments, the controller devices 34*a-c* may transmit and/or receive the information between each other via a wired connection and/or a wireless communication protocol.

In some embodiments, as discussed above in FIG. 6, one of the controller devices 34*a-c* may be designated as the master device 35 and configured to control the other controller devices 34*a-c*. Other embodiments may include an independent hub device 98 configured to transmit information to each controller device 34*a-c*, receive information from each controller device 34*a-c*, and selectively control each controller device 34*a-c*.

In some embodiments, the hub device 98 may include a server, a mobile device, or another local or remote device in communication with each controller devices 34*a-c*. The hub device 98 may communicate with each controller device 34*a-c* via a wired or wireless connection. In some embodiments, the hub device 98 may be configured to query each of the controller devices 34*a-c* for a vote of the user, to receive the votes from the controller devices 34*a-c*, and to tally the votes.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, JavaScript, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented an interactive workspace integration system and method. The disclosure is illustrated by example in the drawing figures, and throughout the written description. It should be understood that numerous variations are possible, while adhering to the inventive concept. Such variations are contemplated as being a part of the present disclosure.

What is claimed is:

1. A controller device for integrating a physical workspace having at least one electronic device therein with a virtual workspace corresponding to at least one remote or local location to create an interactive workspace communicating with a plurality of controller devices disposed in the physical workspace, comprising:
   a programmable processor operably coupled to at least one memory device and interfacing with the virtual workspace, wherein the programmable processor is configured to receive media signals from the at least one electronic device and is further configured to generate a control signal based on at least one of the media signals and user input to control the at least one electronic device;
   a base platform having a length extending from a front edge to a back edge along a horizontal axis, wherein an entirety of the length is parallel to and in contact with a supporting surface, the base platform comprising a first multi-directional beam-forming microphone disposed on the front edge and a second multi-directional beam-forming microphone disposed on the back edge, wherein the first and the second multi-directional beam-forming microphones are configured to capture sound from the physical workspace and convert the sound to audio signals;
   a first status bar disposed on the front edge of the base platform and configured to illuminate to provide information to a first user;
   a display panel fixably coupled to the front edge of the base platform and extending upwardly from the front edge towards the back edge at a fixed acute angle, wherein the display panel comprises a front surface, a back surface, and a display screen, wherein the display screen is disposed on the front surface and the fixed acute angle tilts the display screen upwards to optimize a view of the first user, wherein the display screen is configured to display a user control interface and receive user input; and
   a second status bar disposed on the back surface of the display panel and configured to illuminate to provide information to a second user, wherein the display screen is not visible to the second user;
   wherein the status bars are programmable to selectively illuminate continuously or intermittently, in a chosen color or combinations of colors, in response to user input in the control interface including at least one of the following:
   powering on of the multi-directional microphone;
   requesting of the floor; and
   voting, wherein the status bars may be configured to intermittently illuminate a particular color for a vote of no or continuously illuminate a particular color for a vote of yes or vice versa;
   wherein the status bar is further programmable to selectively illuminate continuously or intermittently, in a chosen color or combinations of colors, in response to the availability of a physical workspace.

2. The controller device of claim 1, wherein the second status bar is disposed adjacent to a top edge of the display panel to increase visibility to the second user.

3. The controller device of claim 1, further comprising a network port disposed on the back edge of the base platform, wherein the network port is configured to enable the controller device to communicate with an ethernet network.

4. The controller device of claim 3, wherein the audio signals comprise uncompressed, multi-channel, low-latency digital audio signals and wherein the first and the second multi-directional beam-forming microphones are configured to deliver over the ethernet network.

5. The controller device of claim 1, further comprising an audio port disposed on the base platform, wherein the audio port is configured to couple to an audio output device, wherein the audio signals are received by the audio output device through the audio port.

6. The controller device of claim 1, wherein the controller device comprises dimensions in a range between 4 in.×4 in.×4 in. and 8 in.×8 in.×8 in.

7. The controller device of claim 1, wherein each of the first status bar and the second status bar is configured to indicate an operational state of at least one of the first multi-directional beam-forming microphone and the second multi-directional beam-forming microphone.

8. The controller device of claim 1, wherein the length of the base platform is equal to a height of the display panel and wherein a distance separating the second status bar from the base platform is maximized.

* * * * *